(12) United States Patent
Eder

(10) Patent No.: US 11,099,035 B2
(45) Date of Patent: Aug. 24, 2021

(54) SCANNING UNIT FOR SCANNING AN ANGULAR SCALE AND ANGLE-MEASURING DEVICE HAVING SUCH A SCANNING UNIT

(71) Applicant: DR. JOHANNES HEIDENHAIN GmbH, Traunreut (DE)

(72) Inventor: Peter Eder, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 76 days.

(21) Appl. No.: 16/802,581

(22) Filed: Feb. 27, 2020

(65) Prior Publication Data

US 2020/0278220 A1 Sep. 3, 2020

(30) Foreign Application Priority Data

Mar. 1, 2019 (EP) .................................... 19160261

(51) Int. Cl.
*G01D 5/20* (2006.01)
(52) U.S. Cl.
CPC .................................. *G01D 5/204* (2013.01)
(58) Field of Classification Search
CPC .......... G01D 5/20; G01D 5/204; G01D 11/24; G01D 11/245; G01B 7/30; G01B 11/26; G01B 13/18; G01R 15/188; G01R 5/20; G01R 11/06; G01R 11/36; G01R 27/26
See application file for complete search history.

(56) References Cited

U.S. PATENT DOCUMENTS

| 10,645,810 B2 | 5/2020 | Rissing et al. |
| 2008/0197838 A1* | 8/2008 | Fischer ................ G01D 5/2451 324/207.25 |
| 2015/0108968 A1* | 4/2015 | Basler .................... G01D 5/244 324/207.17 |
| 2018/0220533 A1* | 8/2018 | Rissing ................... G01D 5/24 |

FOREIGN PATENT DOCUMENTS

| DE | 10225013 A1 | 12/2003 |
| DE | 102007063683 B4 | 11/2015 |
| EP | 3355032 A1 | 8/2018 |
| JP | 5128186 B2 * | 1/2013 |

* cited by examiner

*Primary Examiner* — Son T Le
(74) *Attorney, Agent, or Firm* — Leydig, Voit & Mayer Ltd.

(57) ABSTRACT

A scanning unit for an angle-measuring device for scanning an angular scale, so that a relative angular position between the scanning unit and the angular scale about an axis of rotation can be determined, includes a substrate having a first surface, a detector configured to generate signals which are dependent on the angular position, evaluation electronics including electronic components surrounded by a potting compound, and an electrical interface configured to create a connection from the evaluation electronics to subsequent electronics. The detector, electronic components and electrical interface are disposed on the first surface of the substrate. The electronic components and the electrical interface are disposed further away from the axis of rotation than the detector. The potting compound is disposed on the first surface of the substrate circumferentially around the axis of rotation.

15 Claims, 2 Drawing Sheets

SCANNING UNIT FOR SCANNING AN ANGULAR SCALE AND ANGLE-MEASURING DEVICE HAVING SUCH A SCANNING UNIT

CROSS-REFERENCE TO PRIOR APPLICATION

Priority is claimed to European Patent Application No. EP 19160261.4, filed on Mar. 1, 2019, the entire disclosure of which is hereby incorporated by reference herein.

FIELD

The present invention relates to a scanning unit for scanning an angular scale and an angle-measuring device having the scanning unit. Angle-measuring devices are used, for example, in rotary encoders to determine the angular position of two relatively rotatable machines parts.

BACKGROUND

In scanning units of inductive angle-measuring devices, it is common to apply excitation windings and receiver windings in the form of conductive traces to a common substrate, such as a circuit board, that is fixedly attached to, for example, a stator of a rotary encoder. Located opposite this substrate is a further component which has an angular scale in the form of electrically conductive regions formed thereon at periodic intervals as a graduation structure and which is non-rotatably connected to the rotor of the rotary encoder. When an electric excitation field is applied to the excitation windings, then angular-position-dependent signals are generated in the receiving windings or coils during relative rotation between rotor and stator. These signals are then further processed in evaluation electronics.

A fundamental distinction is made between angle-measuring devices with integral bearings and angle-measuring devices without integral bearings, hereinafter referred to as bearingless angle-measuring devices. Angle-measuring devices with integral bearing typically have relatively small rolling-element bearings, so that the relatively rotatable component groups, in particular the scanning unit and the angular scale, are disposed in a defined axial and radial position relative to each other within the respective angle-measuring device. In contrast, in the case of bearingless angle-measuring devices, care must be taken to ensure that the relatively rotatable component groups are fixed in the correct position, in particular at the correct axial distance relative to one another, while being mounted on a machine such as, for example, an (electric) motor. It is not uncommon that such machines or motors generate heat during operation, so that it is advantageous for the angle-measuring device, in particular for the scanning unit, to be designed such that its components are not exposed to excessive temperatures.

EP 3 355 032 A1 describes an angle-measuring device having a supporting substrate, where the evaluation electronics for the detector signals is disposed on the side of the substrate opposite the detectors.

SUMMARY

In an embodiment, the present invention provides a scanning unit for an angle-measuring device for scanning an angular scale so that a relative angular position between the scanning unit and the angular scale about an axis of rotation can be determined. The scanning unit includes a substrate having a first surface, at least one detector configured to generate signals which are dependent on the angular position, evaluation electronics including a plurality of electronic components surrounded by a potting compound, and an electrical interface configured to create a connection from the evaluation electronics to subsequent electronics. The at least one detector, the electronic components and the electrical interface are disposed on the first surface of the substrate. The electronic components and the electrical interface are disposed further away from the axis of rotation than the at least one detector. The potting compound is disposed on the first surface of the substrate circumferentially around the axis of rotation.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
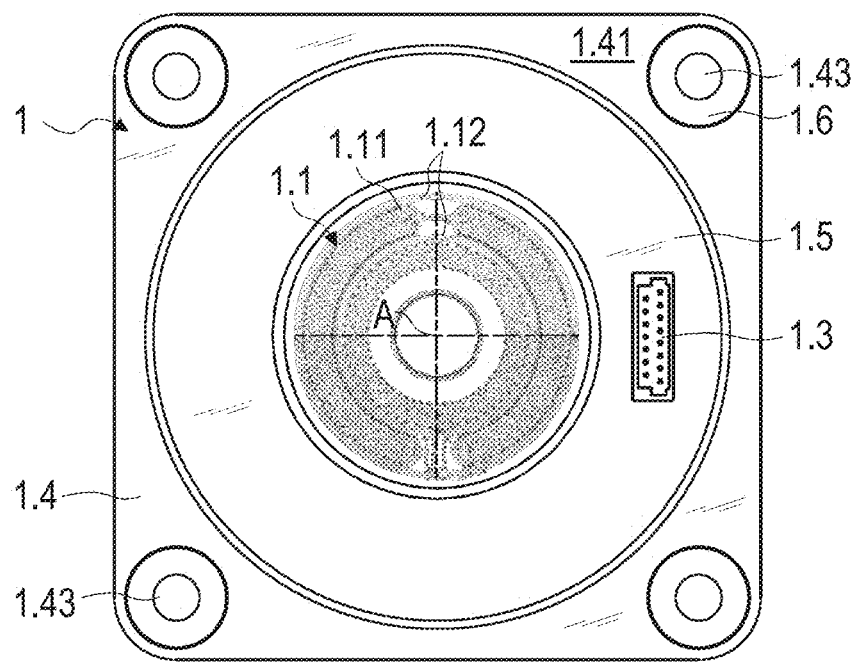
FIG. 1 is a plan view of a scanning unit.

In an embodiment, the present invention provides a scanning unit that is economical to manufacture and has advantages in terms of construction.

According to an embodiment, the present invention provides a scanning unit for an angle-measuring device for scanning an angular scale, so that a relative angular position between the scanning unit and the angular scale about an axis of rotation can be determined. The scanning unit includes a substrate having a first surface. In addition, the scanning unit includes at least one detector capable of generating signals which are dependent on the angular position. The scanning unit further includes evaluation electronics including a plurality of electronic components which are electrically connected to the at least one detector for purposes of signal analysis. Furthermore, electronic components of the evaluation electronics are surrounded by a potting compound. The scanning unit also includes an electrical interface for creating a connection from the evaluation electronics to subsequent electronics. The at least one detector, the electronic components and the electrical interface are disposed on the first surface of the substrate. The electronic components and the electrical interface are disposed further away from the axis of rotation than the at least one detector. The potting compound is disposed on the first surface of the substrate circumferentially around the axis of rotation, so that, in particular, the electronic components and the electrical interface are disposed axially inwardly with respect to the potting compound.

Angle-dependent signals are in particular signals which contain information about the relative angular position between the angular scale and the scanning unit.

The term "electrical interface" is understood to mean an electrically conductive connection between a plurality of conductive elements which are in direct contact; i.e., which touch each other. This may be, for example, an electrical coupling device such as a push-fit connector or a direct cable connection.

In the following, the phrase that "the potting compound is disposed circumferentially around the axis of rotation" is intended to express that the potting compound is disposed, for example, in a closed configuration over 360° around the axis. This phrase may also mean that the potting compound is disposed in an open configuration in the manner of a circumferential segment, so that the potting compound then extends circumferentially over approximately 270°, 180° or 120° around the axis. The phrase further encompasses arrangements where the potting compound is disposed such that it extends with interruptions over 360° around the axis.

The potting compound is in particular formed in an annular or circularly annular shape, for example, as a closed ring or an open or interrupted ring composed of one ring segment or a plurality of ring segments.

Advantageously, the substrate has a thickness of at least 0.5 mm. In particular, the substrate may not only serve as a carrier for the detector, the evaluation electronics and the interface, but also a mechanical supporting element. From this point of view, in particular, the substrate may have a metal layer having a thickness of at least 0.5 mm, so that the metal layer serves as a supporting element. At the same time, a substrate so configured has a relatively good ability to dissipate heat, particularly from the region of the evaluation electronics.

Advantageously, the substrate is flat (i.e., not curved) in shape.

In a further embodiment of the present invention, the substrate has a second surface opposite the first surface, the second surface having no electronic components and/or no interface and/or no detector disposed thereon. In particular, the second surface may be a substantially flat or a substantially smooth surface. The second surface may at the same time serve as, for example, a housing member or as part of an outer housing surface of a motor.

Advantageously, the scanning unit is configured to operate according to an inductive principle. In this case, in particular, the detector is configured as at least one receiver winding.

In a further embodiment of the present invention, the scanning unit has at least one excitation winding disposed on the first surface of the substrate.

Advantageously, the substrate has at least one fastening element disposed radially outwardly of a sealing element. The fastening element may, for example, take the form of a hole or a clip. The sealing element may be, for example, an O-ring or a rope seal, which may, for example, be vulcanized onto the substrate.

Advantageously, the substrate has an edge region extending radially outwardly of the potting compound. In particular, the edge region may extend circumferentially without interruption around the potting compound, so that a margin of the substrate exists radially outwardly of the entire potting compound. In particular, the substrate may have at least one fastening element disposed in the edge region.

In another embodiment, the present invention provides an angle-measuring device including the scanning unit and an angular scale that is rotatable relative to the scanning unit about the axis of rotation, it being possible to determine a relative angular position between the scanning unit and the angular scale. The scanning unit is disposed at an axial offset from the angular scale.

Advantageously, the angular scale is disposed radially inwardly of the potting compound. In particular, in relation to the axial extent of the potting compound, the axial offset is so small that the potting compound is disposed radially outwardly of the angular scale. Thus, the angular scale enters into the volume (of air) circumferentially surrounded the potting compound.

In accordance with another embodiment of the present invention, the angle-measuring device is configured as an inductive angle-measuring device.

In a further embodiment of the present invention, the angular scale has electrically conductive regions at periodic intervals as a graduation structure.

Advantageously, the angular scale is made from electrically conductive material and has elevations and depressions at periodic intervals as a graduation structure. These arrangements may find application in particular when the scanning unit operates according to an inductive principle.

Advantageously, the angle-measuring device is bearingless.

An inductive angle-measuring device is often configured such that the angular scale can be scanned by the scanning unit or by the receiver windings over a large part of its circumference, thus allowing generation of angle-dependent signals. Alternatively, the angle-measuring device may be configured such that the angular scale is scanned at a plurality of scanning points distributed around the circumference thereof.

Other details and advantages of the scanning unit according to embodiments of the present invention will be apparent from the following description of an exemplary embodiment, taken in conjunction with the accompanying drawings.

Figure 2:
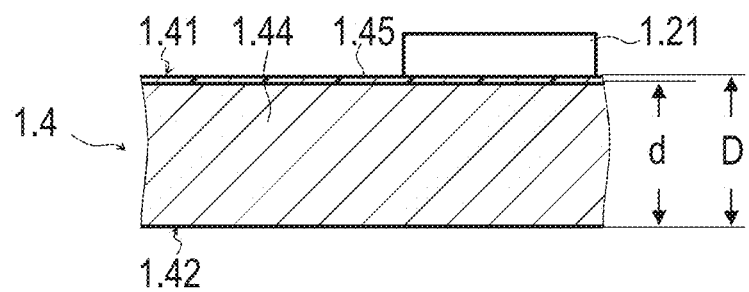
FIG. 2 is a detail view of the scanning unit.

The figures illustrate an exemplary embodiment of a scanning unit 1 for use in an angle-measuring device for scanning an angular scale 2 (see, for example, FIG. 4), the angle-measuring device being capable of determining a relative angular position between scanning unit 1 and angular scale 2 about an axis of rotation A. Accordingly, scanning unit 1 includes, inter alia, a substrate 1.4 which naturally has a first surface 1.41 and a second surface 1.42 opposite the first surface 1.41 (see FIG. 2). In the exemplary embodiment presented here, substrate 1.4 is substantially flat and square in shape and, in addition, has a relatively massive metal layer 1.44, here having a thickness d of 1.0 mm. Disposed on this metal layer 1.44 is an electrically insulating or dielectric layer 1.45, which takes the form of, for example, a polyimide layer such as a varnish or film. Dielectric layer 1.45 is thin compared to metal layer 1.44 and, in the exemplary embodiment presented here, has a thickness of 20 µm. Accordingly, thickness D of substrate 1 is here 1.02 mm. Conductive traces are formed on dielectric layer 1.45.

In the exemplary embodiment presented here, scanning unit 1 is based on an inductive measurement principle. Accordingly, detector 1.1, which is disposed on first surface 1.41, is embodied as a plurality of receiver windings 1.11. Also disposed on first surface 1.41 are a plurality of excitation windings 1.12. In the exemplary embodiment presented here, receiver windings 1.11 and excitation windings 1.12 are arranged substantially concentrically about axis of rotation A.

Figure 3:
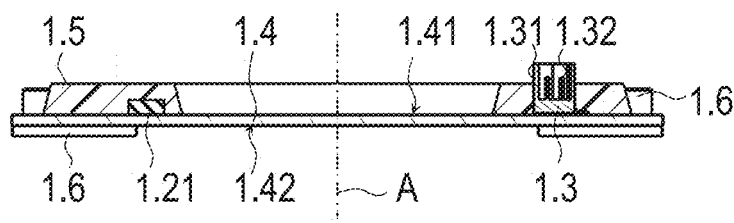
FIG. 3 is a cross-sectional view of the scanning unit.
Figure 5:
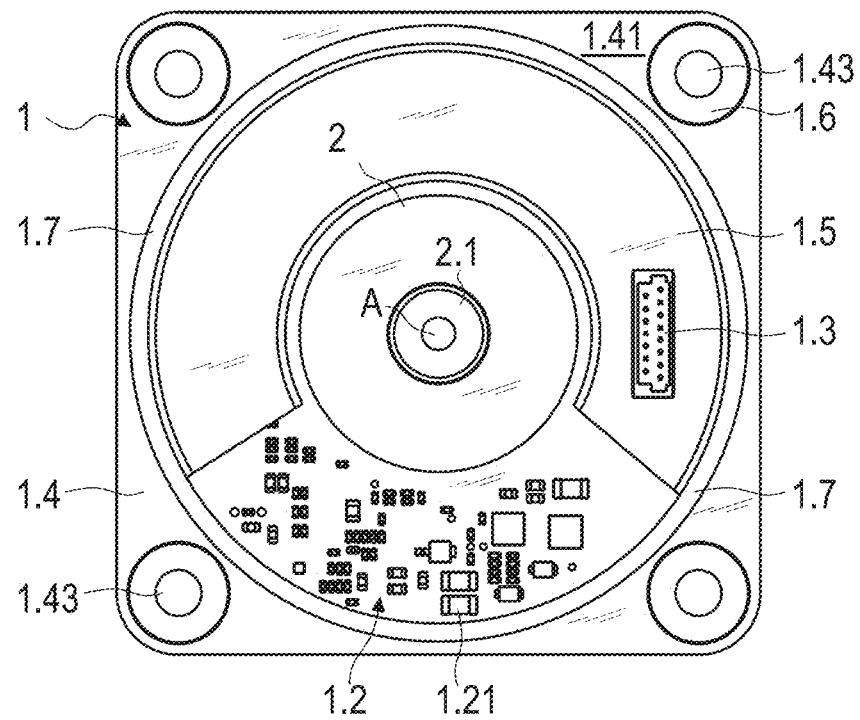
FIG. 5 is a plan view of the angle-measuring device.

The signals that can be generated by detector 1.1 can be transmitted through the conductive traces and further processed in evaluation electronics 1.2. FIG. 5, for example, shows electronic components 1.21 of evaluation electronics 1.2 which are mounted in an annular region on substrate 1.4. Also mounted on substrate 1.4 is an interface 1.3, which is here in the form of a connector or electrical coupling member and includes, in particular, a contact carrier 1.31 that encloses a plurality of electrical contacts 1.32 (FIG. 3). This allows a connecting cable to subsequent electronics to be connected to interface 1.3.

Figure 4:
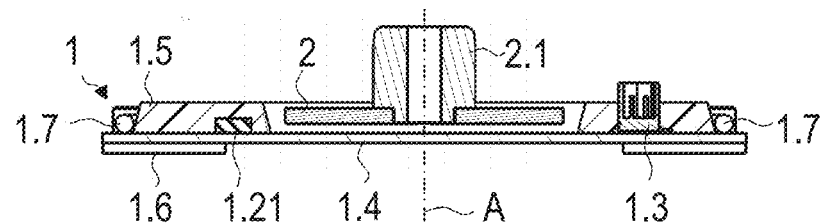
FIG. 4 is a cross-sectional view showing an angle-measuring device with the scanning unit.

After being mounted, the electronic components 1.21 of evaluation electronics 1.2 as well as interface 1.3 or contact carrier 1.31 are potted on substrate 1.4, whereby an annular potting compound 1.5 is formed as shown in FIG. 1. In the view of FIG. 5, annular potting compound 1.5 is cut away in one segment to illustrate electronic components 1.21 of evaluation electronics 1.2. In the exemplary embodiment presented here, other electronic components 1.21 of evaluation electronics 1.2 are located within the volume of potting compound 1.5 in the portion that is not cut away in the illustration. Thus, potting compound 1.5 is disposed on first surface 1.41 of substrate 1.4 circumferentially around axis of rotation A. The inner edge of potting compound 1.5 and the outer edge of potting compound 1.5 are beveled, the outer edge of potting compound 1.5 providing a radial support for a sealing element 1.7. In the exemplary embodiment presented here, sealing element 1.7 takes the form of an O-ring. Sealing element 1.7 bears radially against potting compound 1.5 (FIG. 4). Alternatively, the outer edge of the potting compound may have an undercut, so that the O-ring is, in particular axially, retained in this undercut.

The angle-measuring device includes scanning unit 1 and an angular scale 2, the scanning unit 1 and the angular scale 2 being rotatable relative to each other about axis of rotation A. The angle-measuring device under consideration has no integral bearing (i.e., no rolling-element bearing or sliding bearing) to achieve relative rotatability (bearingless angle-measuring device). Rather, scanning unit 1 is attached to a first machine part and angular scale 2 is attached to a second machine part. The first machine part is rotatable relative to the second machine part. Scanning unit 1 and angular scale 2 are disposed opposite each other, separated by an air gap.

Scanning unit 1 can be attached to the first machine part with the aid of holes 1.43 having inserts fixed therein, for example by a screw connection. The first machine part may be, in particular, a housing of a motor. Substrate 1.4 or metal layer 1.44 serves as a supporting element and may at the same time act, for example, as a cover for the housing of the motor. Since no electronic components, no interface and no detector are disposed on second surface 1.42, second surface 1.42 is suitable to form part of the outer surface of the motor.

The housing of the motor may have a peripheral wall against which sealing element 1.7 presses.

A shaft 2.1 is non-rotatably attached to the angular scale 2 of the angle-measuring device for rigid and non-rotatable attachment to, for example, a machine or motor shaft. Angular scale 2 is formed by an annular circuit board on which conductive and non-conductive regions; i.e., regions of different electrical conductivity, are provided in a periodic sequence and at identical graduation steps. Angular scale 2 and shaft 2.1, taken together, can often also be referred to as a rotor.

During operation of the angle-measuring device, the excitation windings 1.12 on scanning unit 1 generate a homogeneous alternating field which is modulated by angular scale 2 as a function of the angular position or angle of rotation of shaft 2.1. The modulated electromagnetic field generates angle-dependent signals in receiver windings 1.11, which are also located on scanning unit 1.

In the exemplary embodiment presented here, the angle-measuring device is configured according to what is known as "all-round scanning." This means, in particular, that scanning unit 1 is configured such that angular scale 2 can be scanned by scanning unit 1 or by receiver windings 1.11 over almost the entire circumference thereof, thus allowing generation of angle-dependent signals. Accordingly, scanning unit 1 scans nearly the entire graduation structure of angular scale 2 to obtain a signal containing information about the relative angular position.

The signals so generated are then fed to evaluation electronics 1.2, where they are further processed. In an adjustment unit, the signals are adjusted to always have constant signal amplitudes or levels.

In evaluation electronics 1.2, the angular position or the position values of angular scale 2 are determined based on the signals. Furthermore, the angular position and the rotational speed of angular scale 2 are transmitted to the subsequent electronics for further electronic processing.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A scanning unit for an angle-measuring device for scanning an angular scale so that a relative angular position between the scanning unit and the angular scale about an axis of rotation can be determined, the scanning unit comprising:

a substrate having a first surface;

at least one detector configured to generate signals which are dependent on the angular position;

evaluation electronics including a plurality of electronic components, the electronic components of the evaluation electronics being surrounded by a potting compound; and an electrical interface configured to create a connection from the evaluation electronics to subsequent electronics, wherein the at least one detector, the electronic components and the electrical interface are disposed on the first surface of the substrate, wherein the electronic components and the electrical interface are disposed further away from the axis of rotation than the at least one detector, and wherein the potting compound is disposed on the first surface of the substrate circumferentially around the axis of rotation.

2. The scanning unit as recited in claim 1, wherein the substrate has a thickness of at least 0.5 mm.

3. The scanning unit as recited in claim 2, wherein the substrate has a metal layer, the metal layer having a thickness of at least 0.5 mm.

4. The scanning unit as recited in claim 1, wherein the substrate has a second surface opposite the first surface, the second surface having no electronic components disposed thereon.

5. The scanning unit as recited in claim 1, wherein the detector is configured as at least one receiver winding.

6. The scanning unit as recited in claim 5, further comprising at least one excitation winding disposed on the first surface of the substrate.

7. The scanning unit as recited in claim 1, wherein the substrate has at least one fastening element disposed radially outwardly of a sealing element.

8. The scanning unit as recited in claim 1, wherein the substrate has an edge region extending radially outwardly of the potting compound.

9. The scanning unit as recited in claim 8, wherein the substrate has at least one fastening element disposed in the edge region.

10. An angle-measuring device for determining a relative angular position between a scanning unit and an angular scale, the angle-measuring device comprising:

the angular scale, which is rotatable relative to the scanning unit about an axis of rotation; and the scanning unit, which is disposed at an axial offset from the angular scale, the scanning unit comprising:

a substrate having a first surface;

at least one detector configured to generate signals which are dependent on the angular position;

evaluation electronics including a plurality of electronic components, the electronic components of the evaluation electronics being surrounded by a potting compound; and an electrical interface configured to create a connection from the evaluation electronics to subsequent electronics, wherein the at least one detector, the electronic components and the electrical interface are disposed on the first surface of the substrate, wherein the electronic components and the electrical interface are disposed further away from the axis of rotation than the at least one detector, and wherein the potting compound is disposed on the first surface of the substrate circumferentially around the axis of rotation.

11. The angle-measuring device as recited in claim 10, wherein the angular scale is disposed radially inwardly of the potting compound.

12. The angle-measuring device as recited in claim 10, wherein the angle-measuring device is configured as an inductive angle-measuring device.

13. The angle-measuring device as recited in any of claim 10, wherein the angular scale has electrically conductive regions at periodic intervals as a graduation structure.

14. The angle-measuring device as recited in any of claim 10, wherein the angular scale is made from electrically conductive material and has elevations and depressions at periodic intervals as a graduation structure.

15. The angle-measuring device as recited in any of claim 10, wherein the angle-measuring device is bearingless.

* * * * *